United States Patent Office 3,481,886
Patented Dec. 2, 1969

3,481,886
POLYVINYL ALCOHOL FOAMS AND COMPOSITIONS FOR MAKING THE SAME
Bernard C. Lawes, Wilmington, Del., assignor to E. I. du Pont de Nemours and Company, Wilmington, Del., a corporation of Delaware
No Drawing. Filed Nov. 24, 1965, Ser. No. 509,633
Int. Cl. C08f 3/34, 45/44, 47/08
U.S. Cl. 260—2.5                                    12 Claims

ABSTRACT OF THE DISCLOSURE

A gelled, hydroxylated, polymeric foam, such as a gelled polyvinyl alcohol foam, containing a flame retardant-plasticizer selected from the group consisting of urea, mixtures of urea and thiourea having at least 25% urea, and mixtures of urea and water-soluble isothiocyanate having at least 50% urea, in which the amount of flame retardant-plasticizer and hydroxylated polymer present in the foam is within the ratio range of 0.5 to 2.0 parts of flame retardant-plasticizer for every part of hydroxylated polymer.

This invention relates to hydroxylated polymeric insulating and packaging foams which contain large amounts of combustible materials and certain flame retardants which are incorporated therein. More specifically, this invention relates to hydroxylated polymeric foams having urea, mixtures of urea and thiourea, or mixtures of urea and water soluble isothiocyanate incorporated therein as flame retardants. In another aspect, this invention is directed to the aqueous solutions and dry mixes of ingredients from which these flame resistant foams are prepared.

Polymeric foams, by reason of their large surface area to mass ratio, tend to burn very rapidly when ignited. Hydroxylated polymeric foams formed by using air as the foaming agent are especially flammable due to the presence of this oxidizing agent within the cells of the foam. In attempting to reduce the flammability of hydroxylated polymeric foams generated from aqueous solutions through the use of air, many materials have been tested. Among such materials were ammonium dihydrogen phosphate, ethyl phosphate, zinc phosphate, aluminum phosphate, ferric phosphate, sodium pyrophosphate, sodium phosphite, ammonium meta-vanadate, sodium and ammonium hypophosphite, boron phosphate, ammonium fluoroborate, ferric oxide, ferric hydroxide, antimony trioxide, mixtures of antimony oxide with ammonium trichloroacetate and mixtures of antimony oxide with chloral hydrate. Most of the phosphates as well as sodium phosphite and ammonium meta-vanadate interfere with the proper gelling of the wet foam. Those compounds listed above which do not interfere with the gelling of the foam were found to be ineffective flame retardants. In addition, it was found that some of the plasticizers presently being employed to control brittleness, enhanced the flammability of the forms with which they were used. Glycerine is an example of such plasticizers.

It is an object of this invention to provide flame resistant hydroxylated polymeric foams.

It is a further object of this invention to provide as a flame retardant in hydroxylated polymeric foams compounds which do not interfere with the gelling of the hydroxylated polymer and which do not deleteriously affect the products resulting from gelation.

It is a further object of this invention to use as a flame retardant in hydroxylated polymeric foams a material which will function as a plasticizer for the foams.

It is still a further object of this invention to use as a ame retardant in hydroxylated polymeric foams a material which is highly suited for blending with other ingredients in the preparation of foamable formulations.

It is still another object of this invention to use as a flame retardant in hydroxylated polymeric foams a material which is non-volatile and which will impart its beneficial characteristics to the foam throughout the useful life of the foam.

Still another object of this invention is to provide dry mixes and aqueous formulations from which foams having all of the above desirable characteristics can be made. These as well as other objects will be obvious to one skilled in the art reading the following detailed disclosure of the invention.

Hydroxylated polymeric foams containing urea, mixtures of urea and thiourea, having at least 25% urea, or mixtures of urea and water soluble isothiocyanates, such as ammonium isothiocyanate, sodium isothiocyanate and potassium isothiocyanate, having at least 50% urea in the ratio of 0.5 to 2.0 parts of flame retardant for every part of hydroxylated polymeric foam, exhibit all of the advantages set forth above in the objects of the invention.

Polyvinyl alcohol foams, the preferred example of the hydroxylated polymeric foams, above referred to are preferably prepared as are the other hydroxylated polymeric foams of this invention from aqueous solutions and are foamed through the inclusion and mixing of air therewith. It is contemplated that solvents other than water and gases and gaseous mixtures other than air can be used in conjunction with the hydroxylated polymers and the same retardants of this invention, but such materials are not as economical as are water and air.

The flame retardants of this invention are usable with foams formed from partially hydrolyzed as well as fully hydrolyzed polyvinyl alcohol. The expression "fully hydrolyzed polyvinyl alcohol" is meant to include all those polyvinyl alcohols which have at least 99% of the functional groups replaced by a hydroxyl radical. "Partially hydrolyzed polyvinyl alcohols" refer to those polyvinyl alcohol polymers which have from 50 to 99% of their functional groups replaced by hydroxyl radicals. An example of a fully hydrolyzed polyvinyl alcohol is "Elvanol" 72–60. This polyvinyl alcohol is preferred and has been used in the examples to demonstrate the invention. An example of a partially hydrolyzed polyvinyl alcohol is "Elvanol" 50–42.

The effectiveness of the flame retardants of this invention is not dependant on the specific gelling reagents employed to gel the polyvinyl alcohol. Any of a number of combinations, gelling agents, precursors plus precursor activators can be relied upon to gel the polyvinyl alcohol including those contained in the Alden J. Deyrup application, Ser. No. 282,160 filed May 21, 1963.

One system for gelling polyvinyl alcohol involves the use of a compound of an element capable of existing in more than one valence state such as chromium, iron, titanium, or vanadium. Titanium in the trivalent state does not gel polyvinyl alcohol, but when it is transformed into tetravalent titanium in immediate and direct contact with polyvinyl alcohol, it becomes a highly effective gelling agent. This transformation can be accomplished by mixing a solution containing a trivalent titanium salt such as titanium trichloride with a solution which contains the polyvinyl alcohol together with a suitable oxidizing agent, such as a nitrate. Alternately, the trivalent titanium compound may be mixed with the polyvinyl alcohol solution, and the oxidizing agent may be subsequently introduced. For best results, it is important that the titanium oxidation not take place until the trivalent titanium compound is closely intermixd with the polyvinyl alcohol, in contrast to forming the tetravalent titanium well in advance and thereafter mixing it with the polymer. Comparable results are also obtainable by converting chromium from the hexavalent state to the trivalent state, iron from the divalent state to the trivalent state, and/or vanadium from the pentavalent state to a lower valence state.

Various gelling systems depend on a change in the pH to bring about gelation. This may be accomplished by introducing a suitable acidic or alkaline agent into the polymer-containing aqueous medium, whereupon the resulting mixture is promptly subjected to foaming. In another system, the foam is first generated and is then promptly treated with an acidic gas such as carbon dioxide or hydrogen chloride, or an alkaline gas such as ammonia, in order to bring about the gelation.

Still another gelation system involves providing the gelling agent in the proper valence state but in a complexed form which initially inhibits its activity, and then at the desired time destroying the complex so as to initiate the gelation reaction. Tetravalent titanium, for example, can be suitably complexed by various hydroxy acids such as lactic acid, tartaric acid, citric acid and oxalic acid. When titanium lactate or potassium-titanium oxalate or an alkali fluotitanate is converted from a pH in the range of 2-6 to a pH in the range of 7-9, the gelation process commences promptly with any polyvinyl alcohol that is present in the system. The speed of this gelation reaction tends to be increased by means of a higher (i.e., more alkaline) pH, and it tends to be decreased by the presence of increasing concentrations of the anion of the acid, i.e., lactate, oxalate, etc. By simultaneously controlling both the pH and the amount of excess anion, it therefore becomes possible to control the gelation rate very precisely and to vary it at will from very short time periods of a few seconds or less to much longer time periods, of the order of many minutes or even hours.

These latter gelation systems may be utilized, for example, by mixing one solution containing the polymer and the titanium oxalate with another solution containing the desired amount of alkaline reagent and the desired amount of excess oxalate ion. Promptly after mixing the two solutions together, the combined liquid is passed through a tube into which suitable-sized air bubbles are injected in order to obtain a foam of the desired cell size. It is also possible to use this general approach with a single body of liquid which is maintained very close to the critical pH point by means of a bicarbonate-carbonic acid buffer system. When this liquid medium is subjected to foaming by introducing air bubbles in a suitable manner, the web portions of the resulting foam give off carbon dioxide vapor into the atmosphere and into the void spaces in the newly formed foam until a new equilibrium is established between the carbon dioxide in the vapor phase and the carbonic acid and bicarbonate in the water-containing phase. This liberation of carbon dioxide shifts the pH toward the basic side, with the result that the gelation reaction is initiated and it continues until a strong gel has been produced.

The term "gelling agent precursor" as used throughout the specification and claims designates all those substances, complexes and ions which are not capable of gelling polyvinyl alcohol in solution, but which when contacted by a suitable precursor activator will be converted to a gelling agent which does gel polyvinyl alcohol. Included within this term are, for example, ions in a valence state such that they do not gel polyvinyl alcohol but which are capable of conversion to another valence state by either oxidation or reduction at which the converted ions do gel polyvinyl alcohol. Also encompassed by the expression "gelling agent precursor" are complexes and ions which are not capable of gelling polyvinyl alcohol but which are capable of conversion as by a pH change to either ions or complexes which do gel polyvinyl alcohol. In addition, the term is meant to include substances which in solution at a first pH level do not gel polyvinyl alcohol but which at another pH level do gel polyvinyl alcohol.

Preferably, however, and for purposes of demonstrating this invention, a water soluble oxalate of titanium, potassium titanium oxalate, is employed as the gelling agent precursor. At pH values of about 5 and less, solutions of polyvinyl alcohol and potassium titanium oxalate do not react to produce gel structures but at pH values of about 7 and above, polyvinyl alcohol in solution is gelled by potassium titanium oxalate.

The term "precursor activator" as used throughout the specification and claims includes those substances which function to convert the gelling agent precursor to a gelling agent. This term includes oxidizing agents, reducing agents and pH modifying agents of both the acidic and alkaline types.

The precursor activators employed with the above preferred gelling agent precursor are alkaline pH modifying agents, as for example, sodium bicarbonate, ammonia, magnesium oxide, magnesium carbonate, methylamine and calcium carbonate.

In addition to the above ingredients, inert fillers such as carbon black and kaolin clay can be incorporated into the solutions from which the foams are generated and gelled. Other fillers such as sand and fibers can also be used. Dispersants such as "marasperce CB" in effective amounts, as for example in weights equal to 2.5% of the filler employed may be used as desired. Foaming of the solutions can be promoted by the use of surfactants such as isooctylphenoxypolyethoxy ethanol, dodecyltrimethylammonium chloride and sodium lauryl sulfate.

Employing the materials set forth above, foams were prepared from two general types of aqueous formulations, and the urea, urea/thiourea and urea/water soluble isothiocyanate flame retardants were added in the solutions merely by taking advantage of their water solubility.

The first general type (I) consisted of two aqueous solutions (A and B) which were mixed immediately prior to foaming. Bullet foam generators, such as that described in my co-pending application, Ser. No. 509,620, filed Nov. 24, 1965 can be used to foam formulations of the first general type (I). These devices effect foaming by passing air at slightly above atmospheric pressure through thin films or streams of the two solutions which have been mixed as by a T connection immediately prior to entry into the devices.

The second general type (II) consisted of a single aqueous solution which is foamed and thereafter contacted with an alkaline gas, mist or spray which gels the polyvinyl alcohol. The gaseous pH modifying agent is preferably ammonia. Devices suitable for foaming formulations of the second general type (II) are characterized in that they contain a high shear mixing unit through which the mixtures of air in the pressure range of 30 to 200 p.s.i. and preferably in the range of 40 to 90 p.s.i. and the solution are passed at high velocity. These devices are further characterized in that a conduit is provided adjacent the exit end of the device for the injection of the pH modifying agent into the previously foamed polyvinyl alcohol solution. Co-pending application, Ser. No. 509,620, filed Nov. 24, 1965 further describes in greater detail devices usable for foaming formulations of the second general type (II).

To demonstrate the invention, foams of the two formulation types having wet densities within the range of 1.5 to 6 lbs./ft.$^2$ were prepared from the solutions of Table I and were tested. The identities of the specific flame retardants employed are set forth thereafter in the test examples. Unless otherwise stated, the amount of flame retardant employed was equal in weight to the amount of polyivnyl alcohol present. The percentages and parts of ingredients set forth in the specification and claims are percentages and parts by weight.

TABLE I

General Type I

| Solution A: | Percent |
|---|---|
| Polyvinyl alcohol ("Elvanol" 72-60) | 2.5 |
| Carbon black (incl. 2.5% by weight of "Marasperce CB" based on the amount of carbon black) | 5.0 |
| Acetic acid (stabilizer) | 0.2 |
| Flame retardant and/or glycerine | 2.5 |
| Potassium-titanium-oxalate | 0.46 |
| Water | 89.34 |
| Solution B: | |
| Sodium bicarbonate | 3.2 |
| Sodium oxalate | 2.1 |
| Water | 94.7 |

General Type II

| | |
|---|---|
| Polyvinyl alcohol ("Elvanol" 72-60) | 2.0 |
| Kaolin clay (filler) | 4.0 |
| Dodecyltrimethylammonium chloride (surfactant) | 0.13 |
| Isooctylphenoxypolyethoxy ethanol (surfactant) | 0.33 |
| Flame retardant | 2.0 |
| Potassium-titanium-oxalate | 0.5 |
| Water | 91.04 |

The two solutions of General Type I set forth in Table I were mixed in ratios of two parts of A solution for every one part of B solution, and when the mixed solutions had been foamed, gelled and dried, they typically contained, excluding the moisture contained in dry foams under ambient conditions, approximately 19% polyvinyl alcohol, approximately 19% flame retardant, approximately 38% filler and approximately 24% various salts. While, as illustrated above, the polyvinyl alcohol, carbon black and flame retardant have been included in solution A, these materials may be included in solution B as desired.

The polyvinyl alcohol solution of Table I, General Type II was foamed and then contacted with ammonia gas to gel the polyvinyl alcohol. The foam typically contained, excluding moisture as above, approximately 22% polyvinyl alcohol, approximately 22% flame retardants, approximately 44% filler, approximately 5.5% surfactant, and the remainder, which consisted of salts arising from the interaction of potassium titanium oxalate with ammonia.

Samples of the foams prepared in the manners above indicated from the solutions of Table I were subjected to a plurality of tests to demonstrate the effectiveness of the flame retardants of this invention.

The following four tests were used to assess the effectiveness of the flame retardants.

*Test A.*—Observation of flame spread on ignition of a pile of shreds of foam on a ¼″ mesh wire screen from below with a Bunsen burner.

*Test B.*—ASTM-E 162-60T (Radiant-Panel Flame Spread Test). Briefly, a 6 x 18 x 1″ test sample, in close proximity to a radiant heat source maintained at 1238° F., was ignited and the time for a flame front to travel down 3″ increments of the sample was noted. Temperature increases produced by heat from the advancing flame front were measured by a thermocouple in an overhead chimney during the period of flame spread. The flame spread ratings, $I_s$, are a composite of a flame spread factor, $F_s$, and a heat evolution factor, $Q$, or $I_s = F_s \cdot Q$. See ASTM-E 162 for calculations and diagrams of the apparatus.

*Test C.*—ASTM D1692-59T. In this test a sample of foam 1 x 2 x 6″ on a ¼″ mesh screen was ignited at one end with a Bunsen burner for 60 seconds. The propagation of flame and self-extinguishing of any burning was noted.

*Test D.*—ASTM E-84-61. (Tunnel Test)—Underwriters' Laboratories, Northbrook, Ill. The apparatus comprises recording instruments and a horizontal furnace lined with firebrick, 25′ long by 21″ wide by about 12″ deep, with a horizontal opening at one end and a vertical chimney at the other. The sample, 25′ long, is placed against the furnace ceiling which consists of an air tight lid. Metal rods and chicken wire are used to support the sample against the ceiling and to prevent possible collapse of the sample on burning thereof. The nozzle of a methane gas burner is located one foot inside the horizontal opening of the furnace under the sample.

The test is run by regulating the burner so that its methane-fed flame burns for a distance of 4½′ from the nozzle of the burner on the underside of the sample for a period of 10 minutes, during which time an air current travels through the furnace in the direction of burning at about 2.5 miles/hour. Burning of the sample is observed through glass observation ports in the side of the furnace.

Three ratings are reported from this test:

(1) *Flame spread.*—The flame spread index is the rating of greatest concern to builders and building code drafters, and is simply a measure of the extent of burning beyond the end of the ignition source, i.e. beyond 5½′. By comparison, untreated red oak is given a value of 100 and burns completely (19½′) in 5½ minutes ±15 seconds. For material which is self-extinguishing the rating is calculated by the relation, $$\frac{\text{No. of feet burned}}{19\frac{1}{2}'} \times 100$$

A rating of 25 or less is generally accepted as meaning that the material is essentially noncombustible. This rating does not take into account smoldering.

(2) *Fuel contributed.*—This rating gives an indication of heat produced by the test material being consumed and is measured by a thermocouple inserted into the sample 23′ from the flame end of the sample. The measurement is made over the 10-minute test period. A rating of about 25 is considered good, with a rating of zero being ideal. See ASTM E-84-61 for the calculations used to obtain this rating.

(3) *Smoke developed.*—This rating gives an indication of the smoke produced from the material being tested. A device located in the chimney responds to and indicates the amount of smoke being produced by the test sample. Readings under 100 are considered satisfactory. Plastics especially give high numbers in this rating; nonfoamed plastics routinely give readings in excess of 200.

EXAMPLES SUBJECTED TO TEST A

Foams (General Type I and II) which contained 19% by weight glycerine gave inflamed masses in test A whereas foams (General Type I and II) containing 19% by weight urea gave no indication of inflaming.

EXAMPLES SUBJECTED TO TEST B

Foams (General Type I) containing either 19% plasticizer or 19% flame retardant or 19% mixtures thereof, on being subjected to Test B, gave the following ratings:

TABLE II

| Ex. No. | Flame Retardant and Plasticizer | Flame Spread Index $I_s$— | Average $I_s$— |
|---|---|---|---|
| I | None, glycerine | 101, 79, 89, 89 | 90 |
| II | 1:1 Urea/glycerine* | 45, 65, 45, 45, 45, 56 | 49 |
| III | 2:1 Urea/ammonium isothiocyanate | 23, 11, 17, 9 | 15 |
| IV | 1:1 Urea/ammonium isothiocyanate | .1, 22, 34, 22, 34, 45 | 26 |
| V | 1:3 Urea/thiourea | 50, 11, 34, 34 | 32 |
| VI | 1:1 Urea/thiourea | .1, 34, 34, 11 | 17 |
| VII | 2:1 Urea/thiourea | .1, .1, .1, 34 | 9 |
| VIII | 4:1 Urea/thiourea | .1, 34, 11, 11 | 14 |
| IX | Urea | 34, 11, 11, 34 | 23 |
| X | 5:1 Urea/thiourea at 20% higher loading than retardants in foregoing compositions. | .1, .1, .1, .1, | 0.1 |

*Note that favorable results were obtained when 9½% of glycerine was left in a composition containing urea.

In Example I the flame front traversed the entire surface of the sample within 2 seconds but in the other entries the flame front extinguished before reaching the end of the sample. Self-extinguishing was especially prominent in Examples III, IV, VI and X.

A foam sample prepared from General Type II, containing a mixture of urea and thiourea in a 4:1 ratio as the flame retardant, in the Radiant Panel Flame Spread test gave the ratings, $I_s$=15, 13, 8, 8. The flame self-extinguished before traversing the test sample.

It is pointed out that self-extinguishing took place in spite of the fact that the samples were positioned quite close to a hot radiant source. Of the several tests to which the foams of this invention have been subjected, this test best demonstrates the utility of these foams for insulation purposes.

EXAMPLES SUBJECTED TO TEST C

A sample of foam (General Type I) which contained neither glycerine nor flame retardant, was ignited with a Bunsen burner and the flame was observed to spread rapidly over the surface. When a sample containing glycerine and no flame retardant was tested, the inflaming was even more pronounced. Samples (General Type I) containing urea, mixtures of urea and thiourea and mixtures of urea and ammonium isothiocyanate in the ratio range set forth in Table II, and no glycerine, on ignition with the flame from a Bunsen burner exhibited virtually no flame spread. At most, there was a very brief small flame which very quickly self-extinguished. Foams prepared from General Type II containing urea, mixtures of urea and thiourea having at least 66% urea, and mixtures of urea and ammonium isothiocyanate having at least 50% urea did not evidence flame spread in this test.

EXAMPLES SUBJECTED TO TEST D

A foam sample prepared from General Type I and containing 19.0% of a 2:1 ratio of urea/thiourea as the flame retardant was tested in the Underwriters' Laboratories Tunnel Test to confirm results obtained from the Radiant Panel test.

The values of each of the three ratings were obtained from the above described sample and comparative values are given for other known insulation.

TABLE III

| Ex. No. | | Flame Spread | Fuel Contributed | Smoke Developed |
|---|---|---|---|---|
| 1 | Foam (General Type I) 19% urea/thiourea mixture (2:1 urea to thiourea ratio). | 20 | 0 | 15 |
| 2* | Owens-Corning Fiberglas Corp. Glass Fiber Blankets: | | | |
| | Basic Blanket | 10-20 | 10-15 | 0-20 |
| | Foil Screen Kraft Facing | 40 | 5 | 101-200 |
| | Foil Screen Foil Facing | 25 | 20 | 10 |
| | Aluminum Foil Facing | 10-15 | 20-25 | 0-10 |
| 3* | Johns-Manville Corp. Mineral Fiber Batts, Uncoated. | 20 | 20 | 0 |
| 4* | Hagan Manufacturing Co. Pulverized Paper. | 30 | 40 | 35 |

*Data obtained from Building Materials List, Underwriters' Laboratories, Inc., Jan., 1964, pp. 31, 32, 50.

The most successful fire resistant foams were those wherein the flame retardant comprises a mixture of urea and thiourea in ratios of 2:1–5:1. The data relating to Examples V–IX in Table II, supra, show that certain ratios of urea/thiourea are more effective than others. The data, in fact, suggest a synergistic effect of urea and thiourea when the thiourea is present as the minor quantity. While ratios of urea and thiourea in the range of from 2:1 to 5:1 are preferred, the invention contemplates the use of urea to thiourea ratios having at least 25% urea.

Mixtures of urea and ammonium isothiocyanate also exhibited unexpected beneficial results when the amount of ammonium isothiocyanate did not exceed 50 percent.

While it is preferred, as indicated above, to use an amount of flame retardant equal to the amount by weight of polyvinyl alcohol present, it is within the scope of this invention to use an amount of flame retardant varying from 0.5 to 2.0 times the amount of polyvinyl alcohol present.

Dry mix formulations can be prepared having concentration limits within the range set forth in Table IV below. The dry mix formulations can be prepared, shipped and added to water at the location of use.

TABLE IV

| Ingredients: | Dry mix formulations (parts per weight) |
|---|---|
| Polyvinyl alcohol | 100 |
| Flame retardant | 50–200 |
| Filler | 0–1000 |
| Surfactant | 0–200 |
| Gelling agent precursor | 2–50 |

The dry mix formulations can be dissolved in water to produce solutions containing from 1 to 4% polyvinyl alcohol and the other ingredients in the previously-stated proportions to the polyvinyl alcohol.

While the invention has been explained above using polyvinyl alcohol, hydroxylated polymers other than this preferred material can be used. Examples of such materials are methylcellulose, polysaccharides and galactomannans, and they can be employed in substantially the same amounts as polyvinyl alcohol.

Having set forth the above embodiments of this invention to illustrate rather than limit the invention, what is claimed is as follows:

1. A flame retardant foam which comprises a gelled, polyvinyl alcohol foam containing a flame retardant-plasticizer selected from the group consisting of urea, mixtures of urea and thiourea containing at least 25% urea, mixtures of urea and water-soluble isothiocyanate containing at least 50% urea, said foam containing 0.5 to 2.0 parts of flame retardant-plasticizer per part of polyvinyl alcohol.

2. The foam of claim 1 in which the flame retardant-plasticizer is a mixture of urea and thiourea containing 2 to 5 parts of urea per part of thiourea.

3. A combination for the production of fire resistant, gelled, polyvinyl alcohol foam which comprises a first aqueous solution containing a water-soluble gelling agent precursor selected from the group consisting of trivalent titanium compounds and divalent iron compounds and a second aqueous solution containing a water-soluble oxidizing agent which is capable of converting said gelling agent precursor to the next higher valence state, at least one of said solutions containing polyvinyl alcohol and at least one of said solutions containing a flame retardant-plasticizer selected from the group consisting of urea, mixtures of urea and thiourea containing at least 25% urea, and mixtures of urea and water-soluble isothiocyanate containing at least 50% urea, said flame retardant-plasticizer being present in the amount of 0.5 to 2.0 parts per part of polyvinyl alcohol.

4. A combination for the production of fire resistant, gelled, polyvinyl alcohol foam which comprises a first aqueous solution containing a water-soluble gelling agent precursor selected from the group consisting of hexavalent chromium compounds and pentavalent vanadium compounds and a second aqueous solution containing a water-soluble reducing agent which is capable of converting said gelling agent precursor to a lower valence state, at least one of said solutions containing polyvinyl alcohol and at least one of said solutions containing a flame retardant-plasticizer selected from the group consisting of urea, mixtures of urea and thiourea containing at least 25% urea, and mixtures of urea and water-soluble isothiocyanate containing at least 50% urea, said flame retardant-plasticizer being present in the amount of 0.5 to 2.0 parts per part of polyvinyl alcohol.

5. A combination for the production of fire resistant, gelled, polyvinyl alcohol foam which comprises a first aqueous solution containing a water-soluble tetravalent titanium complex selected from the group consisting of titanium complexes of hydroxy acids, alkali fluotitanates, and oxalates of titanium, and a second aqueous solution containing sufficient water-soluble alkaline reagent to change the pH of the combination to a pH in the range of 7–9 thereby destroying said complex, at least one of said solutions containing polyvinyl alcohol and at least one of said solutions containing a flame retardant-plasticizer selected from the group consisting of urea, mixtures of urea and thiourea containing at least 25% urea, and mixtures of urea and water-soluble isothiocyanate containing at least 50% urea, said flame retardant-plasticizer being present in the amount of 0.5 to 2.0 parts per part of polyvinyl alcohol.

6. The combination of claim 5 in which said gelling agent precursor is a water-soluble oxalate complex of tetravalent titanium.

7. An aqueous solution which comprises polyvinyl alcohol and a water-soluble gelling agent precursor selected from the group consisting of trivalent titanium compounds, hexavalent chromium compounds, divalent iron compounds, pentavalent vanadium compounds, tetravalent titanium complexes of hydroxy acids, alkali fluotitanates of tetravalent titanium, and oxalates of tetravalent titanium, and a flame retardant-plasticizer selected from the group consisting of urea, mixtures of urea and thiourea having at least 25% urea, and mixtures of urea and water-soluble isothiocyanate having at least 50% urea, said solution containing 0.5 to 2.0 parts of flame retardant-plasticizer per part of polyvinyl alcohol.

8. The aqueous solution of claim 7 in which said gelling agent precursor is a water-soluble oxalate complex of tetravalent titanium.

9. An aqueous solution which comprises 1 to 4% by weight of polyvinyl alcohol, 0 to 10 parts by weight of filler per part of polyvinyl alcohol, 0.02 to 0.5 part by weight, per part of polyvinyl alcohol, of water-soluble gelling agent precursor selected from the group consisting of trivalent titanium compounds, hexavalent chromium compounds, divalent iron compounds, pentavalent vanadium compounds, tetravalent titanium complexes of hydroxy acids, alkali fluotitanates of tetravalent titanium, and water-soluble oxalates of tetravlaent titanium, and 0.5 to 2.0 parts by weight, per part of polyvinyl alcohol, of flame retardant-plasticizer selected from the group consisting of mixtures of urea and thiourea containing at least 25% urea, and mixtures of urea and water-soluble isothiocyanate containing at least 50% urea.

10. The aqueous solution of claim 9 in which the flame retardant-plasticizer is a mixture of urea and thiourea containing 2 to 5 parts of urea per part of thiourea.

11. A dry mix comprising one part of polyvinyl alcohol, 0 to 10 parts of filler, 0.02 to 0.5 part of water-soluble gelling agent precursor selected from the group consisting of trivalent titanium compounds, hexavalent chromium compounds, divalent iron compounds, pentavalent vanadium compounds, tetravalent titanium complexes of hydroxy acids, alkali fluotitanates of tetravalent titanium and oxalates of tetravalent titanium, and 0.5 to 2 parts of flame retardant-plasticizer selected from the group consisting of urea, mixtures of urea and thiourea containing at least 25% urea, and mixtures of urea and water-soluble isothiocyanate containing at least 50% urea.

12. The dry mix of claim 11 in which the flame retardant-plasticizer is a mixture of urea and thiourea containing 2 to 5 parts of urea per part of thiourea.

References Cited

UNITED STATES PATENTS

| | | | |
|---|---|---|---|
| 3,240,738 | 3/1966 | Mitamura et al. | 260—45.9 |
| 2,744,291 | 5/1956 | Stastny et al. | |
| 2,912,392 | 11/1959 | Stilbert et al. | |
| 3,318,856 | 5/1967 | Deyrup | 260—2.5 |

MURRAY TILLMAN, Primary Examiner

M. FOELAK, Assistant Examiner

U.S. Cl. X.R.

260—17, 17.4, 29.6, 33.4, 41, 45.9

PO-1050
(5/69)

UNITED STATES PATENT OFFICE
CERTIFICATE OF CORRECTION

Patent No. 3,481,886          Dated December 2, 1969

Inventor(s) Bernard C. Lawes

It is certified that error appears in the above-identified patent and that said Letters Patent are hereby corrected as shown below:

Col. 1, Line 61, "forms" should be -- foams --. Col. 2, Line 12, "ame" should be -- flame --; Line 44, "same" should be -- flame --. Col. 3, Line 21, "intermixd" should be -- intermixed --. Col. 5, Line 16, "polyivnyl" should be -- polyvinyl --. Col. 7, Table II, Example II, "65" should be -- 56 --. Col. 8, Line 36, "trattion" should be -- tration --.

SIGNED AND
SEALED
JUN 2 1970

(SEAL)
Attest:

Edward M. Fletcher, Jr.
Attesting Officer

WILLIAM E. SCHUYLER, JR.
Commissioner of Patents